(12) United States Patent
Traugott et al.

(10) Patent No.: US 6,403,692 B1
(45) Date of Patent: Jun. 11, 2002

(54) FILLED THERMOPLASTIC COMPOSITION

(75) Inventors: Thomas D. Traugott, Sanford, MI (US); Leo R. Novak, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/838,476

(22) Filed: Apr. 19, 2001

(51) Int. Cl.$^7$ .............................................. C08F 110/06
(52) U.S. Cl. ..................... 524/451; 524/425; 524/447; 524/449; 524/445; 524/495; 524/497; 524/492; 524/494; 524/413; 525/240
(58) Field of Search ................... 523/490; 524/451, 524/443, 447, 413, 425, 442; 525/240, 196

(56) References Cited

U.S. PATENT DOCUMENTS

| | | | |
|---|---|---|---|
| 3,236,917 A | 2/1966 | Natta et al. | |
| 3,424,703 A | 1/1969 | Jones, Jr. | 260/18 |
| 3,645,992 A | 2/1972 | Elston | 260/80.78 |
| 3,903,234 A * | 9/1975 | Ikeda et al. | 264/210 R |
| 4,528,303 A * | 7/1985 | Segaud | 523/212 |
| 4,626,557 A * | 12/1986 | Duska et al. | 523/100 |
| 4,701,432 A | 10/1987 | Welborn, Jr. | 502/113 |
| 4,740,538 A * | 4/1988 | Sekutowski | 523/205 |
| 4,798,081 A | 1/1989 | Hazlitt et al. | 73/53 |
| 4,935,397 A | 6/1990 | Chang | 502/117 |
| 4,937,299 A | 6/1990 | Ewen et al. | 526/119 |
| 4,937,301 A | 6/1990 | Chang | 526/128 |
| 4,960,816 A * | 10/1990 | Rice | 524/425 |
| 5,055,438 A | 10/1991 | Canich | 502/117 |
| 5,091,461 A | 2/1992 | Skochodopole | 524/493 |
| 5,194,509 A | 3/1993 | Hasenbein et al. | 525/285 |
| 5,272,236 A | 12/1993 | Lai et al. | 526/348.5 |
| 5,278,272 A | 1/1994 | Lai et al. | 526/348.5 |
| 5,416,148 A * | 5/1995 | Farah et al. | 524/409 |
| 5,712,333 A * | 1/1998 | Hofmeister et al. | 524/140 |
| 6,284,830 B1 * | 9/2001 | Gottschalk et al. | 524/449 |

FOREIGN PATENT DOCUMENTS

| | | | | |
|---|---|---|---|---|
| EP | 260299 | | 3/1988 | |
| EP | 129368 | | 7/1989 | |
| EP | 391413 | | 10/1990 | |
| EP | 639613 | A1 | 2/1992 | |
| JP | 7-316410 | * | 12/1995 | ........... C08L/69/00 |
| WO | WO 90/07526 | | 12/1989 | |

* cited by examiner

*Primary Examiner*—David W. Wu
*Assistant Examiner*—Rip A Lee

(57) ABSTRACT

A filled thermoplastic composition having improved combinations of processability, stiffness and toughness which demonstrates improved scuff resistance in extruded or molded articles is prepared by admixing a thermoplastic polymer, an uncalcined filler and a calcined filler.

12 Claims, No Drawings

FILLED THERMOPLASTIC COMPOSITION

FIELD OF THE INVENTION

This invention relates to filled thermoplastic compositions and fabricated articles thereof.

BACKGROUND OF THE INVENTION

Molded or extruded articles comprising thermoplastic polymers find wide use in a large variety of applications, for example in automobiles, boats, snow mobiles, personal water crafts, all terrain vehicles, home appliances, electronic housings, furniture, floor coverings, wall coverings, footwear such as shoes, boots, ski boots and skates.

Physical property requirements for such articles are varied and application dependent. It is well known to this art that thermoplastic polymers can contain non-polymeric materials as fillers, in order to alter certain of their properties. Thus, various mineral or inorganic fillers can be used in order to change one or more mechanical property of a thermoplastic polymer, such as coefficient of linear thermal expansion; modulus; impact, especially low temperature impact; tensile strength; flexural strength and resilience. For instance, see U.S. Pat. No. 4,528,303 which discloses a polymer matrix comprising a filler prepared by the calcination of clay and, for optimal property performance, the use of a coupling agent.

One important property, especially for the surface of the article, is the resistance to scuffing, sometimes referred to as scratch and mar resistance. "Scuffing" is a surface deformation caused by sliding contacts between two surfaces resulting in a surface or "scuff" mark. For example, when a thermoplastic material used in a vacuum cleaner housing, an automotive bumper fascia, a floor covering or ski boots has a low resistance to scuffing, scuff marks become visible when the vacuum cleaner or bumper occasionally bumps into other objects or when people walk on the floor or when the right ski boot contacts the left ski boot. Such scuff marks are highly undesirable.

SUMMARY OF THE INVENTION

Accordingly, a major object of the present invention is the provision of a filled thermoplastic composition having a balance of mechanical properties, such as processability, stiffness, toughness and scuff resistance, in extruded or molded articles previously unknown to this art.

The filled thermoplastic composition of the present invention comprises (a) a thermoplastic polymer, (b) an uncalcined filler, (c) a calcined filler having an average particle size less than about 2.5 microns and a maximum particle size equal to or less than about 13 microns, optionally (d) an impact modifier and optionally (e) a slip agent.

In another aspect, the present invention involves a method of fabricating (e.g., extruding or molding) articles from a filled thermoplastic composition described hereinabove.

In a further aspect, the invention involves fabricated (e.g., extruded or molded) articles of a filled thermoplastic composition described hereinabove.

The filled thermoplastic compositions of the present invention are especially useful in the preparation of molded objects notably articles having large surfaces prepared by injection molding techniques requiring a good balance of strength and toughness and good scratch and mar resistance. Such properties are particularly desired for fabricated articles in automotive applications such as trims, bumper beams, bumper fascia, pillars, instrument panels and the like; in snow mobile, personal water craft and all terrain vehicle applications such as cowlings, fenders, panels, body covers, and the like; in boats; in electrical and electrical equipment device housing and covers; as well as other household and personal articles, including, for example, appliance housings such as vacuum cleaner housings, housewares, freezer containers, and crates; lawn and garden furniture; building and construction sheet, including floor coverings and wall coverings; footwear such as shoes, boots and outer shells for ski boots, roller skates and ice skates.

DETAILED DESCRIPTION OF THE EMBODIMENTS

Component (a) in the filled thermoplastic composition of the present invention is a thermoplastic polymer. The thermoplastic polymer can be a homopolymer or a copolymer. Preferably, the thermoplastic polymer is a polyolefin (PO), a polycarbonate (PC), a polystyrene (PS), a polyphenylene oxide (PPO), a styrene and acrylonitrile copolymer (SAN), an acrylonitrile, butadiene and styrene copolymer (ABS), a polyester, a polyamide (e.g., Nylon), a thermoplastic polyurethane (TPU, e.g., PELLATHANETM™ or ISOPLASTTM™ made by The Dow Chemical Company), or blends thereof (e.g., PC/ABS, PC/polyester, PPO/PS, Nylon/PPO, Nylon/PO, PO/PS and the like). Generally the polyolefin polymers which are most frequently used are polyethylene (PE) and polypropylene (PP) made by conventional Ziegler-Natta or metallocene catalysts. Polypropylene is most preferred.

The polypropylene suitable for use in this invention is well known in the literature and can be prepared by known techniques. In general, the polypropylene is in the isotatic form, although other forms can also be used (e.g., syndiotatic or atatic). The polypropylene used for the present invention is preferably a homopolymer of polypropylene or a copolymer, for example, a random or block copolymer, of propylene and an alpha-olefin, preferably a $C_2$, or $C_4$ to $C_{20}$ alpha-olefin. The alpha-olefm is present in the polypropylene of the present invention in an amount of not more than 20 percent by mole, preferably not more than 15 percent, even more preferably not more than 10 percent and most preferably not more than 5 percent by mole.

Examples of the $C_2$, and $C_4$ to $C_{20}$ alpha-olefins for constituting the propylene and alpha-olefin copolymer include ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene.

Preferably the polypropylene of the present invention is an isotactic polypropylene having a high degree of crystallinity. A preferable method of determining the degree of crystallinity in polypropylene is by differential scanning calorimetry (DSC). A small sample (milligram size) of the polypropylene is sealed into an aluminum DSC pan. The sample is placed into a DSC cell with a 25 centimeter per minute nitrogen purge and cooled to about −100° C. A standard thermal history is established for the sample by heating at 10° C. per minute to 225° C. The sample is then cooled to about −100° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity, percent} = \frac{\Delta H_{observed}}{\Delta H_{isotactic\ PP}} \times 100$$

where the heat of fusion for isotactic polypropylene ($\Delta H_{isotactic\ PP}$), as reported in B. Wunderlich, Macromolecular Physics, Volume 3, Crystal Melting, Academic Press, New Your, 1980, p 48, is 165 Joules per gram (J/g) of polymer.

As defined herein, a high degree of crystallinity, as determined by DSC, is at least about 62 weight percent, more preferably at least about 64 weight percent, even more preferably at least about 66 weight percent, even more preferably at least about 68 weight percent and most preferably at least about 70 weight percent based on the weight of the polypropylene. The degree of crystallinity for the polypropylene as determined by DSC is less than or equal to about 100 weight percent, preferably less than or equal to about 90 weight percent, more preferably less than or equal to about 80 weight percent, and most preferably less than or equal to about 70 weight percent based on the weight of the polypropylene.

The melt flow rate (MFR) of the polypropylene useful in the present invention is generally equal to or greater than about 1 gram/10 minutes (g/10 min.), preferably equal to or greater than about 5 g/10 min., more preferably equal to or greater than about 10 g/10 min., even more preferably equal to or greater than about 15 g/10 min., and most preferably equal to or greater than about 20 g/10 min. The melt flow rate for polypropylene useful herein is generally equal to or less than about 100 g/10 min., preferably equal to or less than about 75 g/10 min., more preferably equal to or less than about 65 g/10 min., even more preferably equal to or less than about 50 g/10 min., and most preferably equal to or less than about 35 g/10 min. Unless otherwise stated, melt flow rate is determined according to ASTM D 1238 at 230° C. and an applied load of 2.16 kilogram (kg).

If more than one polypropylene component is used it is preferable to have a first polypropylene component with a MFR from 1 to 20 g/10 min., and a second polypropylene component with a MFR from 20 to 100 g/10 min., wherein the resulting polypropylene has a MFR in the range of 15 to 75 and preferably 20 to 65 g/10 min.

Part or all of the polypropylene of the present invention may be graft modified. A preferred graft modification of the polypropylene is achieved with any unsaturated organic compound containing, in addition to at least one ethylenic unsaturation (e.g., at least one double bond), at least one carbonyl group (—C=O) and that will graft to a polypropylene as described above. Representative of unsaturated organic compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, -methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound containing at least one carbonyl group can be grafted to the polypropylene by any known technique, such as those taught in U.S. Pat. Nos. 3,236,917; 5,194,509 and 4,905,541, the disclosures of which are incorporated herein by reference.

The unsaturated organic compound content of the grafted polypropylene is at least about 0.01 weight percent, preferably at least about 0.1 weight percent and most preferably at least about 0.5 weight percent based on the combined weight of the polypropylene and organic compound. The maximum amount of unsaturated organic compound content can vary to convenience, but typically it does not exceed about 10 weight percent, preferably it does not exceed about 5 weight percent and most preferably it does not exceed about 2 weight percent based on the combined weight of the polypropylene and the organic compound.

In general, (a) the thermoplastic polymer is employed in an amount of at least about 40 parts by weight, preferably at least about 45 parts by weight, more preferably at least about 50 parts by weight, most preferably at least about 55 parts by weight based on the weight of the total composition. In general, the thermoplastic polymer is used in amounts less than or equal to about 95 parts by weight, preferably less than or equal to about 90 parts by weight, more preferably less than or equal to about 80 parts by weight, even more preferably less than or equal to about 70 parts by weight, and most preferably less than or equal to about 65 parts by weight based on the weight of the total composition.

Component (b) in the present invention is one or more uncalcined filler, such as calcium carbonate, talc, kaolin, mica, wollastonite, hollow glass beads, titaninum oxide, silica, carbon black, glass fiber, potassium titanate or single layers of a cation exchanging layered silicate material, such as montmorillonite, bidelite, saponite and hectorite. Preferred uncalcined fillers are calcium carbonate, talc, kaolin, mica, wollastonite, or combinations thereof. See for example U.S. Pat. No. 5,091,461; U.S. Pat. No. 3,424,703; EP 639,613 A1 and EP 391,413, here these materials and their suitability as an uncalcined filler for polymeric resins are generally described, the disclosures of which are incorporated herein by reference. A preferred uncalcined filler is talc.

Preferred uncalcined talcs have very low free metal oxide content. The mineral talcs best suited are hydrated magnesium silicates as generally represented by the theoretical formula:

$3MgO.4SiO_2.H_2O$.

Compositions of talcs may vary somewhat with locality in which they are mined.

The suitability of uncalcined fillers in maintaining the preferred properties, for example toughness and stiffness, of molded articles prepared from the resin has been found to be a function of the average length to thickness ratio (L/T) of the filler particles together with obtaining a uniformly small particle-sized filler. Preferred uncalcined fillers have an average L/T preferably from about 1 to about 30. Highly preferred are those compositions incorporating fillers having an average L/T as measured according to the below-described technique of at least about 1, preferably at least about 1.5, more preferably at least about 2, even more preferably at least about 3, and most preferably at least about 4. With regard to the maximum level for the L/T, it has been found desirable to have a value up to and including about 30, preferably up to and including about 25, more preferably up to and including about 20, even more preferably up to and including about 15, and most preferably up to and including about 12.

For determining the L/T ratio, the length of the fillers (or longest dimension, such as the diameter of a plate-shaped particle) as well as their thickness (shortest dimension of the two dimensions measurable) can be measured by preparing a filler modified polymeric resin sample and measuring the particle dimensions of the dispersed particles from digitized images produced by back scattered electron imaging using a scanning electron microscope and analyzing the digitized images in an image analyzer. Preferably, the size of the image is at least 10× the size of the maximum particle size.

The filled thermoplastic compositions included within the scope of this invention generally utilize uncalcined fillers with a number average particle size, as measured by a sedimentation process which measures the gravity-induced settling rates of different size particles in a liquid with known properties, of less than or equal to about 10 microns ($\mu$m) preferably less than or equal to about 3 $\mu$m, more preferably less than or equal to about 2 $\mu$m, more preferably less than or equal to about 1.5 $\mu$m and most preferably less than or equal to about 1.0 $\mu$m. In general, smaller average particle sizes equal to or greater than about 0.001 $\mu$m, preferably equal to or greater than about 0.01 $\mu$m, more preferably equal to or greater than about 0.1 $\mu$m, or most preferably equal to or greater than 0.5 $\mu$m, if available, could very suitably be employed. The filled thermoplastic compositions included within the scope of this invention generally utilize uncalcined fillers with a largest particle size, sometimes referred to as maximum particle size, of less than or equal to about 13 $\mu$m, preferably less than or equal to about 12 $\mu$m, more preferably less than or equal to about 10 $\mu$m and most preferably less than or equal to about 8 $\mu$m.

Preferably, particle size determinations are preformed on a SEDIGRAPH™ 5100 (using a WINDOWS™—based software program) available from Micromeritics. Test samples are prepared by suspending three grams of talc in 25 ml of a 0.1 percent Daxad 30 solution followed by addition of 2 ml of isopropyl alcohol. The mixture is stirred. An additional 25 ml of 0.1 percent Dadax 30 solution is added and the sample is sonicated then analyzed. The following report options are selected: Cumulative Fraction Table, Cumulative Graph and Frequency Graph.

The uncalcined fillers in the filled thermoplastic compositions according to the present invention are present in an amount of at least about 1 part by weight, preferably at least about 2 parts by weight, more preferably at least about 3 parts by weight, even more preferably at least about 4 parts by weight, and most preferably at least about 6 parts by weight based on the total weight of the composition. Usually it has been found sufficient to employ an amount of uncalcined filler up to and including about 30 parts by weight, preferably up to and including about 25 parts by weight, more preferably up to and including about 20 parts by weight and most preferably up to and including about 15 parts by weight based on the total weight of the composition.

Component (c) in the present invention is one or more calcined filler, preferably talc, kaolin or combinations thereof. See for example U.S. Pat. No. 4,528,303 where these materials and their suitability as a calcined filler for polymeric resins are generally described, the entire disclosure of which is incorporated herein by reference. Calcined talc is a preferred calcined filler.

Calcination treatment consists of heating the selected mineral to a temperature of at least 800° C., the process being carried out in the atmosphere, under a nitrogen atmosphere or under a moist air atmosphere; it is possible to carry out the process in a static or dynamic furnace. This calcination causes, on the one hand, a dehydroxylation reaction of the mineral, which will evolve its structural water above 800° C., and on the other hand, a conversion reaction of its initial crystallographic structure, which will give rise to an intimate in-situ mixture of enstatite and silica. The admixture is essentially enstatite and silica but, can also contain small amounts of mineral impurities associated with the nature of the deposit, which do not constitute a problem. The heating time is not critical and can vary over wide limits, for example, ranging from a few seconds (in the case of flash calcination) to about ten hours (in the case of calcination in a batch rotary furnace). Of course, this time must in all cases be sufficient to perform the crystallographic conversion referred to above.

The calcined talc which is preferably used according to the present invention consists of heating in a static or rotary furnace at a temperature from 900° C. to 1300° C. for a period of time ranging from 30 minutes to five hours.

Percent calcination of the talc can be determined by the following formula:

$$\text{Percent Calcination}=100\times[1.0-(\text{adjusted LOI/total theoretical weight loss})]$$

Where loss on ignition (LOI) is determined by weighing a sample, preferably a 1.5 to 2.0 gram sample, of talc into a pre-fired, pre-weighed (W1) platinum crucible. It is transferred to an oven, dried at 200° C. for 10 minutes and cooled in a desiccator. The cooled sample and crucible is weighed (W2), transferred to a muffle furnace, calcined at 1000° C. for 30 minutes, and cooled in a desiccator. The cooled sample and crucible is weighed (W3) and the weight loss (LOI) is calculated as follows:

$$\text{Percent Weight Loss}=[(W2-W3)/(W2-W1)]*100$$

The LOI is adjusted to account for any residue or artifact included in the LOI measurement (adjusted LOI). The adjusted LOI is compared to the total theoretical weight loss for 100 percent calcination of the talc, which is typically about 4.4 percent. For example, a 1 gram sample of talc with an adjusted LOI of 0.0022 gram would have a 95 percent calcination of:

$$95\text{Percent Calcination}=100\times[1.0-(0.0022\text{ gram}/0.044\text{ gram})]$$

Preferably the calcined talc of the present invention has a percent calcination equal to or greater than 80, more preferably equal to or greater than 85 and most preferably equal to or greater than 90 as measured by LOI.

Preferably the calcined talc of the present invention has a Hunter L* dry brightness value equal to or greater than about 60, more preferably equal to or greater than about 65 and most preferably equal to or greater than about 70 as measured by test method ASTM E 1347.

The filled thermoplastic compositions included within the scope of this invention generally utilize calcined fillers with a number average particle size as measured by a sedimentation method discussed hereinabove of less than about 2.5 $\mu$m preferably less than or equal to about 2.4 $\mu$m, more preferably less than or equal to about 2.2 $\mu$m, more preferably less than or equal to about 2 $\mu$m and most preferably less than or equal to about 1.5 $\mu$m. In general, smaller average particle sizes equal to or greater than about 0.1 $\mu$m, preferably equal to or greater than about 0.3 $\mu$m, more preferably equal to or greater than about 0.5 $\mu$m, or most preferably equal to or greater than 0.6 $\mu$m, if available, could very suitably be employed. The filled thermoplastic compositions included within the scope of this invention generally utilize calcined fillers with a maximum particle size, of less than or equal to about 13 $\mu$m, preferably less than or equal to about 12 μm, more preferably less than or equal to about 10 μm, even more preferably less than or equal to about 8 μm, even more preferably less than or equal to about 6 μm and most preferably less than or equal to about 4 μm.

The calcined fillers in the filled thermoplastic compositions according to the present invention are present in an amount of at least about 1 part by weight, preferably at least about 2 parts by weight, more preferably at least about 3 parts by weight, even more preferably at least about 4 parts by weight, and most preferably at least about 6 parts by weight based on the total weight of the composition. Usually it has been found sufficient to employ an amount of calcined filler up to and including about 30 parts by weight, preferably up to and including about 25 parts by weight, more preferably up to and including about 20 parts by weight and most preferably up to and including about 15 parts by weight based on the total weight of the composition.

The filled thermoplastic compositions of the present invention may further comprise component (d) an impact modifier. Preferable impact modifiers are elastomeric or rubbery materials having a $T_g$ equal to or less than 0° C., preferably equal to or less than –10° C., more preferably equal to or less than –20° C., and most preferably equal to or less than –30° C. $T_g$ is the temperature or temperature range at which a polymeric material shows an abrupt change in its physical properties, including, for example, mechanical strength. $T_g$ can be determined by differential scanning calorimetry.

Suitable impact modifiers include polymers such as acrylate rubbers, particularly homopolymers and copolymers of alkyl acrylates having from four to six carbons in the alkyl group. Suitable impact modifiers can also be grafted homopolymers or copolymers of butadiene that are grafted with a polymer of styrene and methyl methacrylate. Some of the preferred rubber-containing materials of this type are the known methyl methacrylate, butadiene, and styrene-type (MBS-type) core/shell grafted copolymers having a $T_g$ equal to or less than 0° C. and a rubber content greater than 40 percent, typically greater than 50 percent. They are generally obtained by graft polymerizing styrene and methyl methacrylate and/or equivalent monomers in the presence of a conjugated diene polymer rubber core, preferably a butadiene homo- or co-polymer. The grafting monomers may be added to the reaction mixture simultaneously or in sequence, and, when added in sequence, layers, shells or wart-like appendages can be built up around the substrate latex, or core. The monomers can be added in various ratios to each other.

Polyolefin elastomers comprising one or more $C_2$ to $C_{20}$ alpha-olefins in polymerized form are preferred impact modifiers. Examples of the types of polymers from which the present polyolefin elastomers are selected include copolymers of alpha-olefins, such as ethylene and propylene, ethylene and 1-butene, ethylene and 1-hexene or ethylene and 1-octene copolymers, and terpolymers of ethylene, propylene and a diene comonomer such as hexadiene or ethylidene norbornene.

A preferable polyolefin elastomer is a substantially linear ethylene polymer or a linear ethylene polymer (S/LEP), or a mixture of one or more of each. Both substantially linear ethylene polymers and linear ethylene polymers are known. Substantially linear ethylene polymers and their method of preparation are fully described in U.S. Pat. Nos. 5,272,236 and 5,278,272. Linear ethylene polymers and their method of preparation are fully disclosed in U.S. Pat. Nos. 3,645, 992; 4,937,299; 4,701,432; 4,937,301; 4,935,397; 5,055, 438; EP 129,368; EP 260,999; and WO 90/07526.

As used here, "a linear ethylene polymer" means a homopolymer of ethylene or a copolymer of ethylene and one or more alpha-olefin comonomers having a linear backbone (i.e. no cross linking), no long-chain branching, a narrow molecular weight distribution and, for alpha-olefin copolymers, a narrow composition distribution. Further, as used here, "a substantially linear ethylene polymer" means a homopolymer of ethylene or a copolymer of ethylene and of one or more alpha-olefin comonomers having a linear backbone, a specific and limited amount of long-chain branching, a narrow molecular weight distribution and, for alpha-olefin copolymers, a narrow composition distribution.

Short-chain branches in a linear copolymer arise from the pendent alkyl group resulting upon polymerization of intentionally added $C_3$ to $C_{20}$ alpha-olefin comonomers. Narrow composition distribution is also sometimes referred to as homogeneous short-chain branching. Narrow composition distribution and homogeneous short-chain branching refer to the fact that the alpha-olefin comonomer is randomly distributed within a given copolymer of ethylene and an alpha-olefin comonomer and virtually all of the copolymer molecules have the same ethylene to comonomer ratio. The narrowness of the composition distribution is indicated by the value of the Composition Distribution Branch Index (CDBI) or sometimes referred to as Short Chain Branch Distribution Index. CDBI is defined as the weight percent of the polymer molecules having a comonomer content within 50 percent of the median molar comonomer content. The CDBI is readily calculated, for example, by employing temperature rising elution fractionation, as described in Wild, Journal of Polymer Science, Polymer Physics Edition, Volume 20, page 441 (1982), or U.S. Pat. No. 4,798,081. The CDBI for the substantially linear ethylene copolymers and the linear ethylene copolymers in the present invention is greater than about 30 percent, preferably greater than about 50 percent, and more preferably greater than about 90 percent.

Long-chain branches in substantially linear ethylene polymers are polymer branches other than short chain branches. Typically, long chain branches are formed by insitu generation of an oligomeric alpha-olefin via beta-hydride elimination in a growing polymer chain. The resulting species is a relatively high molecular weight vinyl terminated hydrocarbon which upon polymerization yields a large pendent alkyl group. Long-chain branching may be further defined as hydrocarbon branches to a polymer backbone having a chain length greater than n minus 2 ("n–2") carbons, where n is the number of carbons of the largest alpha-olefin comonomer intentionally added to the reactor. Preferred long-chain branches in homopolymers of ethylene or copolymers of ethylene and one or more $C_3$ to $C_{20}$ alpha-olefin comonomers have at least from 20 carbons up to more preferably the number of carbons in the polymer backbone from which the branch is pendant. Long-chain branching may be distinguished using $^{13}C$ nuclear magnetic resonance spectroscopy alone, or with gel permeation chromatography-laser light scattering (GPC-LALS) or a similar analytical technique. Substantially linear ethylene polymers contain at least 0.01 long-chain branches/1000 carbons and preferably 0.05 long-chain branches/1000 carbons. In general, substantially linear ethylene polymers contain less than or equal to 3 long-chain branches/1000 carbons and preferably less than or equal to 1 long-chain branch/1000 carbons.

Preferred substantially linear ethylene polymers are prepared by using metallocene based catalysts capable of readily polymerizing high molecular weight alpha-olefin copolymers under the process conditions. As used here, copolymer means a polymer of two or more intentionally added comonomers, for example, such as might be prepared by polymerizing ethylene with at least one other $C_3$ to $C_{20}$ comonomer. Preferred linear ethylene polymers may be prepared in a similar manner using, for instance, metallocene or vanadium based catalyst under conditions that do not permit polymerization of monomers other than those intentionally added to the reactor. Other basic characteristics of substantially linear ethylene polymers or linear ethylene polymers include a low residuals content (i.e. a low concentration therein of the catalyst used to prepare the polymer, unreacted comonomers and low molecular weight oligomers made during the course of the polymerization), and a controlled molecular architecture which provides good processability even though the molecular weight distribution is narrow relative to conventional olefin polymers.

While the substantially linear ethylene polymers or the linear ethylene polymers used in the practice of this invention include substantially linear ethylene homopolymers or linear ethylene homopolymers, preferably the substantially linear ethylene polymers or the linear ethylene polymers comprise between about 50 to about 95 weight percent ethylene and about 5 to about 50, and preferably about 10 to about 25 weight percent of at least one alpha-olefin comonomer. The comonomer content in the substantially linear ethylene polymers or the linear ethylene polymers is generally calculated based on the amount added to the reactor and as can be measured using infrared spectroscopy according to ASTM D-2238, Method B. Typically, the substantially linear ethylene polymers or the linear ethylene polymers are copolymers of ethylene and one or more $C_3$ to $C_{20}$ alpha-olefins, preferably copolymers of ethylene and one or more $C_3$ to $C_{10}$, alpha-olefin comonomers and more preferably copolymers of ethylene and one or more comonomers selected from the group consisting of propylene, 1-butene, 1-hexene, 4-methyl-1-pentane, and 1-octene. Most preferably the copolymers are ethylene and 1-octene copolymers.

The density of these substantially linear ethylene polymers or linear ethylene polymers is equal to or greater than about 0.850 grams per cubic centimeter (g/cm³), preferably equal to or greater than about 0.855 g/cm³, more preferably equal to or greater than about 0.857 g/cm³ and most preferably equal to or greater than about 0.858 g/cm³. Generally, the density of these substantially linear ethylene polymers or linear ethylene polymers is less than or equal to about 0.935 g/cm³, preferably less than or equal to about 0.900 g/cm³, more preferably less than or equal to about 0.872 g/cm³, even more preferably less than or equal to about 0.868 g/cm³ and most preferably less than or equal to about 0.863 g/cm³.

If more than one substantially linear ethylene polymer component or linear ethylene polymer component is used, it is preferable to have a first substantially linear ethylene polymer component or linear ethylene polymer component with a density from about 0.855 to about 0.864 g/cm³ and a second substantially linear ethylene polymer component or linear ethylene polymer component with a density from about 0.865 to about 0.872 g/cm³, wherein the resulting substantially linear ethylene polymer, linear ethylene polymer or combination thereof has a density from about 0.857 to about 0.870 g/cm³ and most preferably from about 0.858 to about 0.868 g/cm³.

The melt flow ratio for substantially linear ethylene polymers, measured as $I_{10}/I_2$, is greater than or equal to about 5.63, is preferably from about 6.5 to about 15, and is more preferably from about 7 to about 10. $I_2$ is measured according to ASTM Designation D 1238 using conditions of 190° C. and 2.16 kilogram ("kg") mass. $I_1$ is measured according to ASTM Designation D 1238 using conditions of 190° C. and 10.0 kg mass.

The molecular weight distribution ($M_w/M_n$) for substantially linear ethylene polymers is the weight average molecular weight ($M_w$) divided by number average molecular weight ($M_n$). $M_w$ and $M_n$ are measured by gel permeation chromatography (GPC). For substantially linear ethylene polymers, the $I_1/I_2$ ratio indicates the degree of long-chain branching, i.e. the larger the $I_{10}/I_2$ ratio, the more long-chain branching exists in the polymer. In preferred substantially linear ethylene polymers $M_w/M_n$ is related to $I_{10}/I_2$ by the equation: $M_w/M_n \leq (I_{10}/I_2)-4.63$. Generally, $M_w/M_n$ for substantially linear ethylene polymers is at least about 1.5 and preferably at least about 2.0 and is less than or equal to about 3.5, more preferably less than or equal to about 3.0. In a most preferred embodiment, substantially linear ethylene polymers are also characterized by a single differential scanning calorimetry (DSC) melting peak.

The preferred $I_2$ melt index for these substantially linear ethylene polymers or linear ethylene polymers is from about 0.1 g/10 min. to about 100 g/10 min., more preferably about 0.5 g/10 min. to about 20 g/10 min. and most preferably 0.5 g/10 min. to 10 g/10 min.

If more than one substantially linear ethylene polymer component or linear ethylene polymer component is used, it is preferable to have a first substantially linear ethylene polymer component or linear ethylene polymer component with a $I_2$ melt index from 0.4 to 0.9 g/10 min. and a second substantially linear ethylene polymer component or linear ethylene polymer component with a $I_2$ melt index from 1 to 10 g/10 min.

The impact modifier is employed in the filled thermoplastic composition of the present invention in amounts sufficient to provide the desired balance of processability and impact resistance. In general, the impact modifier is employed in amounts of at least about 1 part by weight, preferably at least about 5 parts by weight, more preferably at least about 10 parts by weight and most preferably at least about 15 parts by weight based on the weight of the total composition. In general, the impact modifier is used in amounts less than or equal to about 40 parts by weight, preferably less than or equal to about 35 parts by weight, more preferably less than or equal to about 30 parts by weight, even more preferably less than or equal to about 25 parts by weight and most preferably less than or equal to about 20 parts by weight based on the weight of the total composition.

The filled thermoplastic composition of the present invention optionally contains component (e) a slip agent. Preferably the slip agent is ionic more preferably the slip agent is non-ionic. Exemplary of ionic slip agents are salt derivatives of aromatic or aliphatic hydrocarbon oils, such as magnesium stearate, calcium stearate or zinc stearate.

Useful non-ionic slip agents include, but are not limited to, for example, aromatic or aliphatic hydrocarbon oils, as well as esters, amides, alcohols and acids of such oils, for example, mineral oils, naphthenic oils, paraffinic oils, glycerol monostearate, pentaerythritol monooleate, stearamides, saturated fatty acid amides or ethylenebis(amides), unsaturated fatty acid amides or ethylenebis(amides), adipic acid, sebacic acid, styrene-alpha-methyl styrene, natural oils such as castor, corn, cottonseed, olive, rapeseed, soybean, sunflower, other vegetable and animal oils, as well as esters, alcohols, and acids of the oils, polyether polyols or waxes, such as polyethylene waxes.

Preferred non-ionic slip agents are glycols or fluoro-containing polymers. Even more preferred non-ionic slip agents are silicone polymers, preferably silicone oils. Most preferred non-ionic slip agents are unsaturated fatty acid amides for example, oleamide, erucamide, linoleamide, and mixtures thereof.

Generally preferred concentrations of the slip agent is in the range of from about 0 parts to about 0.5 parts by weight, preferably of from about 0.1 parts to about 0.4 parts by weight and most preferably of from about 0.2 parts to about 0.3 parts by weight based on the weight of the total composition.

Further, the claimed filled thermoplastic compositions may also optionally contain one or more additives that are commonly used in thermoplastic compositions of this type. Preferred additives of this type include, but are not limited to: ignition resistant additives, stabilizers, colorants, antioxidants, antistats, flow enhancers, nucleating agents, including clarifying agents, etc. Preferred examples of additives are ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize thermoplastic compositions against degradation caused by, but not limited to heat, light, and oxygen, or a mixture thereof may be used.

Depending on the additive and the desired effect, such additives may be present in an amount from at least about 0.01 parts, preferably at least about 0.1 parts, more preferably at least about 1 part, more preferably at least about 2 parts and most preferably at least about 5 parts by weight based on the total weight of the composition. Generally, the additive is present in an amount less than or equal to about 25 parts, preferably less than or equal to about 20 parts, more preferably less than or equal to about 15 parts, more preferably less than or equal to about 12 parts, and most preferably less than or equal to about 10 parts by weight based on the total weight of composition.

Preparation of the filled thermoplastic compositions of this invention can be accomplished by any suitable mixing means known in the art, including dry blending the individual components and subsequently melt mixing, either directly in an extruder used to make the finished article (e.g., the automotive part), or pre-mixing in a separate extruder (e.g., a Banbury mixer). Dry blends of the compositions can also be directly injection molded without pre-melt mixing.

When softened or melted by the application of heat, the filled thermoplastic compositions of this invention can be fabricated into articles using conventional techniques such as compression molding, injection molding, gas assisted injection molding, calendering, vacuum forming, thermoforming, extrusion and/or blow molding, alone or in combination. The filled thermoplastic compositions can also be formed, spun, or drawn into films, fibers, multi-layer laminates or extruded sheets, or can be compounded with one or more organic or inorganic substances, on any machine suitable for such purpose. The filled thermoplastic compositions of the present invention are preferably injection molded.

To illustrate the practice of this invention, examples of the preferred embodiments are set forth below. However, these examples do not in any manner restrict the scope of this invention.

EXAMPLES

The compositions of Example 1 and Comparative Examples A and B are compounded on a Werner and Pfleiderer ZSK-30, 30 millimeter (mm) twin screw extruder. An intimate mixture of the components, polymers and fillers, is added via a single vibratory feeder. The extruder output is 44 pounds per hour (lb/h.). The following are the compounding conditions on the ZSK-30 extruder: Barrel temperature profile: 169° C., 181° C., 192° C. and 208° C.; Die temperature: 217° C.; Melt temperature: 225° C.; Screw speed: 250 revolutions per minute (rpm); Pressure: 32 pounds per square inch (psi) and Torque: 21 ft-lb. The extrudate is cooled in the form of strands and comminuted as pellets. The pellets are used to prepare test specimens on a 90 ton Toyo injection molding machine, having the following molding conditions: Melt temperature: 200° C.; Mold temperature: 43° C.; Back pressure: 500 psi and Cycle time: 41 seconds (s.).

The formulation content of Example 1 to 3 and Comparative Examples A to C are given in Table 1 below in parts by weight of the total composition. In Table 1:

"PP-1" is an isotatic polypropylene copolymer comprising about 3.4 percent by weight ethylene having a density of 0.903 g/cm$^3$, a melt flow rate of 65 at 230° C. and an applied load of 2.16 kg;

"PP-2" is an isotatic polypropylene/ethylene copolymer available as C712-50RNSA Dow propylene from Dow Chemical having a density of 0.90 g/cm$^3$ and a melt flow rate of 50 at 230° C. and an applied load of 2.16 kg;

"PP-3" is an isotatic polypropylene homopolymer available as AMOCO 9934 from Amoco having a molecular weight distribution of about 14.8, density of 0.91 g/cm$^3$, a melt flow rate of 35 at 230° C. and an applied load of 2.16 kg;

"PP-4" is an isotatic polypropylene homopolymer available as AMOCO 9433 from Amoco having a molecular weight distribution of about 19.8, density of 0.91 g/cm$^3$, a melt flow rate of 12 at 230° C. and an applied load of 2.16 kg;

"PP-5" is a maleic anhydride grafted polypropylene available as EPOLENE™ E43P from Eastman Chemical;

"S/LEP-1" is a substantially linear ethylene/octene copolymer available as AFFINITY™ EG 8200 from The Dow Chemical Company having a density of approximately 0.87 g/cm$^3$, a melt flow rate of 5 g/10 min. determined at 190° C. and an applied load of 2.16 kg, a molecular weight distribution of 2.1 and a CBDI of greater than 50;

"S/LEP-2" is a substantially linear ethylene/octene copolymer available as AFFINITY™ EG 8180 from The Dow Chemical Company having a density of approximately 0.863 g/cm$^3$, a melt flow rate of 0.5 g/10 min. determined at 190° C. and an applied load of 2.16 kg, and a CBDI of greater than 50;

"TALC 1" is a calcined mineral talc having a median particle size of 1.2 μm and a maximum particle size of 7 μm;

"TALC 2" is a calcined mineral talc having a median particle size of 1.8 μm and a maximum particle size of 13 μm;

"TALC 3" is a calcined mineral talc commercially available as STEAPLAST™ 9502 from Luzenac having a median particle size of 2.5 μm and a maximum particle size of 12 μm;

"TALC 4" is a commercially available uncalcined mineral talc available as JETFIL™ 700C from Luzenac having a median particle size of 1.5 μm and a maximum particle size of 10 to 12 μm;

"Erucamide" is an unsaturated fatty amide with the formula $C_2H_{41}CONH_2$ available as KEMAMIDE™ from Witco; and "IRGANOX™ B 225 FF" is a 1:1 mixture of IRGANOX 1010 andtris(2,4-di-tert-butylphenyl phosphite antioxidant available from Ciba Geigy in the form of a flake.

TABLE 1

| Example | 1 | | | 2 | 3 | |
|---|---|---|---|---|---|---|
| Comparative Example | | A | B | | | C |
| COMPOSITION | | | | | | |
| PP-1 | 57.5 | 57.5 | | | | |
| PP-2 | | | 10.5 | | | |
| PP-3 | | | 40.2 | 24.5 | 24.5 | 24.5 |
| PP-4 | | | | 24.5 | 24.5 | 24.5 |
| PP-5 | | | | 1.5 | 1.5 | 1.5 |
| SLEP-1 | 9 | 9 | | | | |
| SLEP-2 | 9 | 9 | 24 | 25 | 25 | 25 |
| Talc-1 | 12 | 24 | | | 12 | |
| Talc-2 | | | 12 | | | |
| Talc-3 | | | | | | 12 |
| Talc-4 | 12 | | 25 | 12 | 12 | 12 |
| Erucamide | 0.3 | 0.3 | | 0.3 | 0.3 | 0.3 |
| IRGANOX B 225 | 0.2 | 0.2 | 0.2 | 0.2 | 0.2 | 0.2 |

The following tests are run on Example 1 to 3 and Comparative Examples A to C and the results of these tests are shown in Table 2:

"MFR" melt flow rate is determined according to ISO 1133 on a Kayness apparatus operating at 230° C. and an applied load of 2.16 kg;

"Flexural Tangent Modulus" is determined in accordance with ISO 178. Testing is performed using a United mechanical tester;

"Notched Izod" is determined according to ISO 180/1A at 23° C.;

"Ash" is determined using a Microwave Muffle Furnace MAS-7000;

"Density" is measured according to ISO 1183;

"Tensile Strength" is done in accordance with ISO R527. Testing is performed using a United mechanical tester;

"HDT" heat distortion under load is determined on a Ceast HDT 300 Vicat machine in accordance to ISO 75 where test specimens are unannealed and tested under an applied pressure of 0.45 MPa;

"Dart" instrumented impact is determined according to ASTM D 3763 using a MTS 810 instrumented impact tester at 15 miles per hour (MPH) impact. Test results were determined at 0° C. Specimens were inspected and judged as brittle or ductile fractures, test results are reported as number of specimens with ductile failure;

"Hardness" Shore D hardness is measured according to ISO 868; and

"Scratch Resistance" levels are determined according to the Ford Lab Test Method (FLTM BN108-13). The apparatus consists of a moveable platform connected to five beams (250 mm long). A scratch pin is attached to one end of each beam. On the tip on each pin is a highly polished hardened steel ball (1.0+/−0.1 mm diameter). Each pin is loaded with a weight that exerts a force on the surface of a test plaque. Four force levels were selected for this study: 15 Newton (N), 10 N, and 7N and 3N. Driven by compressed air, the beams draw the pins across the surface of the plaque, which generates scratches. A sliding velocity of approximately 100 mm/s is maintained. All tests are performed at room temperature on test plaques conditioned at 25° C. for more than 24 h prior to testing. The highest force value that doesn't produce scratches is reported.

TABLE II

| Example | 1 | | | 2 | 3 | |
|---|---|---|---|---|---|---|
| Comparative Example | | A | B | | | C |
| PROPERTIES | | | | | | |
| MFR @ 230° C./kg, g 10 min. | 23 | 24 | 14 | 8.5 | 8 | 7.9 |
| Flexural Tangent Modulus, MPa | 1900 | 1600 | 2200 | 2020 | 2020 | 1950 |
| Notch Izod, ft-lb/in | 36.1 | 36.9 | 35 | 43.2 | 42.6 | 37.9 |
| Ash, % | 24.1 | 24.2 | 24.4 | 23.4 | 23.6 | 23.4 |
| Density, g/cm³ | 1.079 | 1.08 | 1.077 | 1.069 | 1.067 | 1.065 |
| Tensile Yield, psi | 20.2 | 19.8 | 21 | 22.8 | 22.1 | 22.9 |
| HDT @ 0.45 MPa, ° C. | 111.6 | 104.2 | 119 | 108 | 112.9 | 108 |
| Dart, ductile breaks Out of 5 @ 0° C. | 5 | 5 | 5 | 5 | 5 | 3 |
| Hardness (Shore D) | 68.3 | 67.8 | 68.2 | 42.1 | 41.7 | 41 |
| Scratch Resistance, N | 15 | 15 | 7 | 10 | 10 | 10 |

The improvement in retention of impact properties, flexural modulus and scratch resistance when using a filled thermoplastic composition of the present invention is apparent from comparison with the controls.

What is claimed is:

1. A filled thermoplastic composition comprising:
   (a) a polypropylene,
   (b) an uncalcined filler and
   (c) a calcined filler having an average particle size less than about 2.5 microns and a maximum particle size equal to or less than about 13 microns.

2. The filled thermoplastic composition of claim 1 wherein (b) the uncalcined filler is calcium carbonate, talc, kaolin, mica, wollastonite, hollow glass beads, titaninum oxide, silica, carbon black, glass fiber, potassium titanate or single layers of a cation exchanging layered silicate material.

3. The filled thermoplastic composition of claim 1 wherein (b) the uncalcined filler is talc.

4. The filled thermoplastic composition of claim 1 wherein (c) the calcined filler is talc, kaolin or combinations thereof.

5. The filled thermoplastic composition of claim 1 wherein (c) the calcined filler is talc.

6. The filled thermoplastic composition of claim 1 further comprising an impact modifier.

7. The filled thermoplastic composition of claim 6 wherein the impact modifier is a substantially linear ethylene polymer, a linear ethylene polymer or combinations thereof, wherein the substantially linear ethylene polymer and linear ethylene polymer are characterized as having:
   (i) a density of less than about 0.93 g/cm$^3$,
   (ii) a molecular weight distribution, $M_w/M_n$ of less than about 3.0 and
   (iii) a Composition Distribution Branch Index of greater than 30 percent.

8. A filled thermoplastic composition comprising:
   (a) from about 40 to about 95 parts by weight an isotatic polypropylene having a crystalline phase determined by differential scanning calorimetry equal to or greater than about 62 weight percent based on the weight of the isotatic polypropylene;
   (b) from about 1 to about 30 parts by weight of an uncalcined talc;
   (c) from about 1 to about 30 parts by weight of a calcined talc having an average particle size less than about 2.5 microns and a maximum particle size equal to or less than about 13 microns, and
   (d) from about 1 to about 40 parts by weight of a substantially linear ethylene polymer, a linear ethylene polymer or combinations thereof, wherein the substantially linear ethylene polymer and linear ethylene polymer are characterized as having:
   (i) a density of less than about 0.93 g/cm$^3$,
   (ii) a molecular weight distribution, $M_w/M_n$, of less than about 3.0 and
   (iii) a Composition Distribution Branch Index of greater than 30 percent;
   wherein parts by weight are based on the weight of the total filled thermoplastic composition.

9. A process of extruding or molding the filled thermoplastic composition of claim 8 or 1 into a fabricated article.

10. The process of claim 9 wherein the fabricated article is an automotive trim, bumper beam, bumper fascia, pillar, or instrument panel; a snow mobile cowling or body cover; a personal water craft cowling or body cover; an all terrain vehicle cowling, fender, panel or body cover; an electrical equipment device housing; an appliance housing; a freezer container; lawn and garden furniture; building and construction sheet; a shoe; a boot; an outer ski boot shell; or an outer skate shell.

11. The filled thermoplastic composition of claim 8 or 1 in the form of a fabricated article.

12. The filled thermoplastic composition of claim 11 wherein the fabricated article is an automotive trim, bumper beam, bumper fascia, pillar, or instrument panel; a snow mobile cowling or body cover; a personal water craft cowling or body cover; an all terrain vehicle cowling, fender, panel or body cover; an electrical equipment device housing; an appliance housing; a freezer container; lawn and garden furniture; building and construction sheet; a shoe; a boot; an outer ski boot shell; or an outer skate shell.

* * * * *